United States Patent [19]

Soumiya et al.

[11] Patent Number: 5,287,201
[45] Date of Patent: Feb. 15, 1994

[54] CALL RECEIVING METHOD AND APPARATUS

[75] Inventors: Kazuo Soumiya, Kyoto; Tatsuaki Okada, Uji, both of Japan

[73] Assignee: Murata Kikai Kabushiki Kaisha, Kyoto, Japan

[21] Appl. No.: 641,529

[22] Filed: Jan. 15, 1991

[30] Foreign Application Priority Data

Jan. 17, 1990 [JP] Japan ............................. 2-7317

[51] Int. Cl.$^5$ ........................................ H04N 1/32
[52] U.S. Cl. ............................ 358/434; 358/400
[58] Field of Search ............... 379/100; 358/424, 434, 358/435, 438, 439, 440, 444; H04N 1/32, 1/00

[56] References Cited

U.S. PATENT DOCUMENTS

| | | | |
|---|---|---|---|
| 4,502,080 | 2/1985 | Tsuda | 379/100 |
| 4,764,951 | 8/1988 | Kotani et al. | 379/100 |
| 4,800,439 | 1/1989 | Yoshino | 379/100 |
| 4,829,559 | 5/1989 | Izawa et al. | 379/100 |
| 4,939,767 | 7/1990 | Saito et al. | 358/434 |
| 5,065,427 | 11/1991 | Godbole | 358/400 |
| 5,136,634 | 8/1992 | Rae et al. | 358/402 |

*Primary Examiner*—Stephen Brinich
*Attorney, Agent, or Firm*—Spensley Horn Jubas & Lubitz

[57] ABSTRACT

A receiving method in a facsimile system which can provide much contribution to elimination of problems in the calling party side by sharing a part of the automatic function through application of the recording means of the facsimile apparatus. In sending a message responding to the call from the distant party, the signal transmitted from the distant party is subsequently printed and output.

5 Claims, 2 Drawing Sheets

5,287,201

CALL RECEIVING METHOD AND APPARATUS

FIELD OF THE INVENTION

The present invention relates to a facsimile receiving method and, more particularly, to a facsimile receiving method having the automatic answering function.

RELATED ART STATEMENT

Facsimile apparatus including a telephone function to allow conversation and an automatic answering function for printing the messages from a calling party when a receiving party is absent are well known.

The automatic answering function is provided not only on facsimile apparatus which include the telephone function but also on some ordinary telephone sets. In the case of such automatic answering function, when a call is terminated, a message such as "Hello. Mr. or Mrs. Ooooo is speaking. But, I'm now absent. Please, leave your name, telephone number and your message after you hear the signal tone. Your message will be recorded. Thank you." will be transmitted to a calling party. After the signal tone is sent out, the telephone mode is switched to the recording mode and the message from the calling party is recorded on a recording tape or RAM.

Problematically, however some calling parties do not like to leave such message. Accordingly, such a calling party will hook the handset without recording the message. In this case, the automatic answering function cannot be utilized sufficiently.

OBJECT AND SUMMARY OF THE INVENTION

The present invention has been proposed considering such circumstances. Namely, it is an object of the present invention to provide a receiving method in a facsimile system which can substantially eliminate the aforementioned problems related to the calling party side by reforming a portion of the automatic answering function with the printing means of the facsimile apparatus.

One embodiment of the present invention provides a facsimile receiving method wherein a message responding to the call from a calling party is sent while in the automatic answering mode, and subsequently providing printed output of a signal transmitted by the calling party may be printed.

One example of a signal transmitted by a calling party after hearing the message issued from the receiving party is a telephone number which may be issued using push buttons or may be transmitted by a voice signal.

DETAILED DESCRIPTION OF PREFERRED EMBODIMENT

Figure 2:
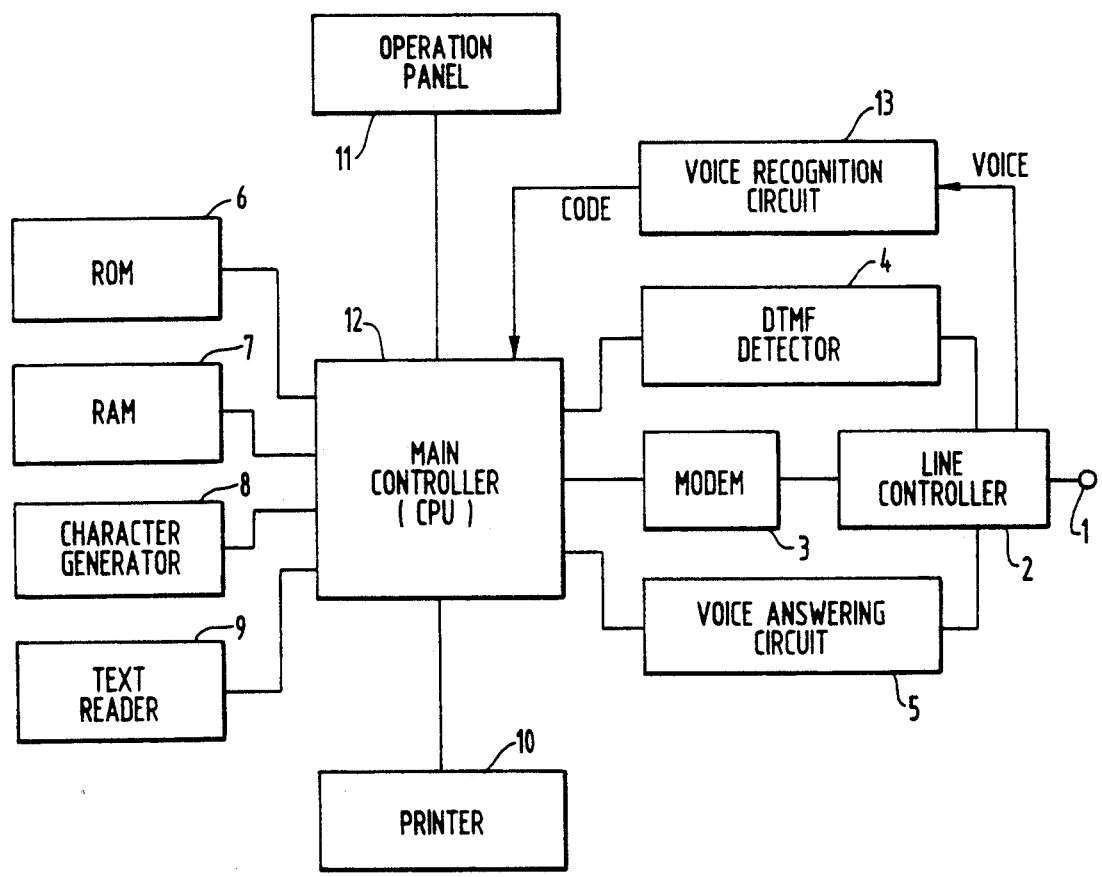
FIG. 2 is a schematic structural diagram illustrating a facsimile apparatus to which the sending method of the present invention may be applied.

FIG. 2 is a schematic structural diagram for explaining a facsimile apparatus which may be used to accordance with an embodiment of the facsimile receiving method of the present invention. In this figure, the reference numeral 1 denotes line; 2, line controller; 3, modem; 4, DTMF detector; 5, voice answering circuit; 6, ROM for storing programs and fixed information; 7, RAM; 8, character generator; 9, text reader; 10, printing circuit; 11, operation panel; 12, main control unit (CPU) for controlling these circuit; 13, voice recognition circuit.

In this embodiment, upon hearing the response message, a calling party is requested to send the telephone number of calling party using the push buttons on the telephone set. The dial tone issued from the calling party by pushing the push buttons is detected at the receiving side by the DTMF detector 4 and the detected signal is converted into image data by the character generator 8.

Figure 1:
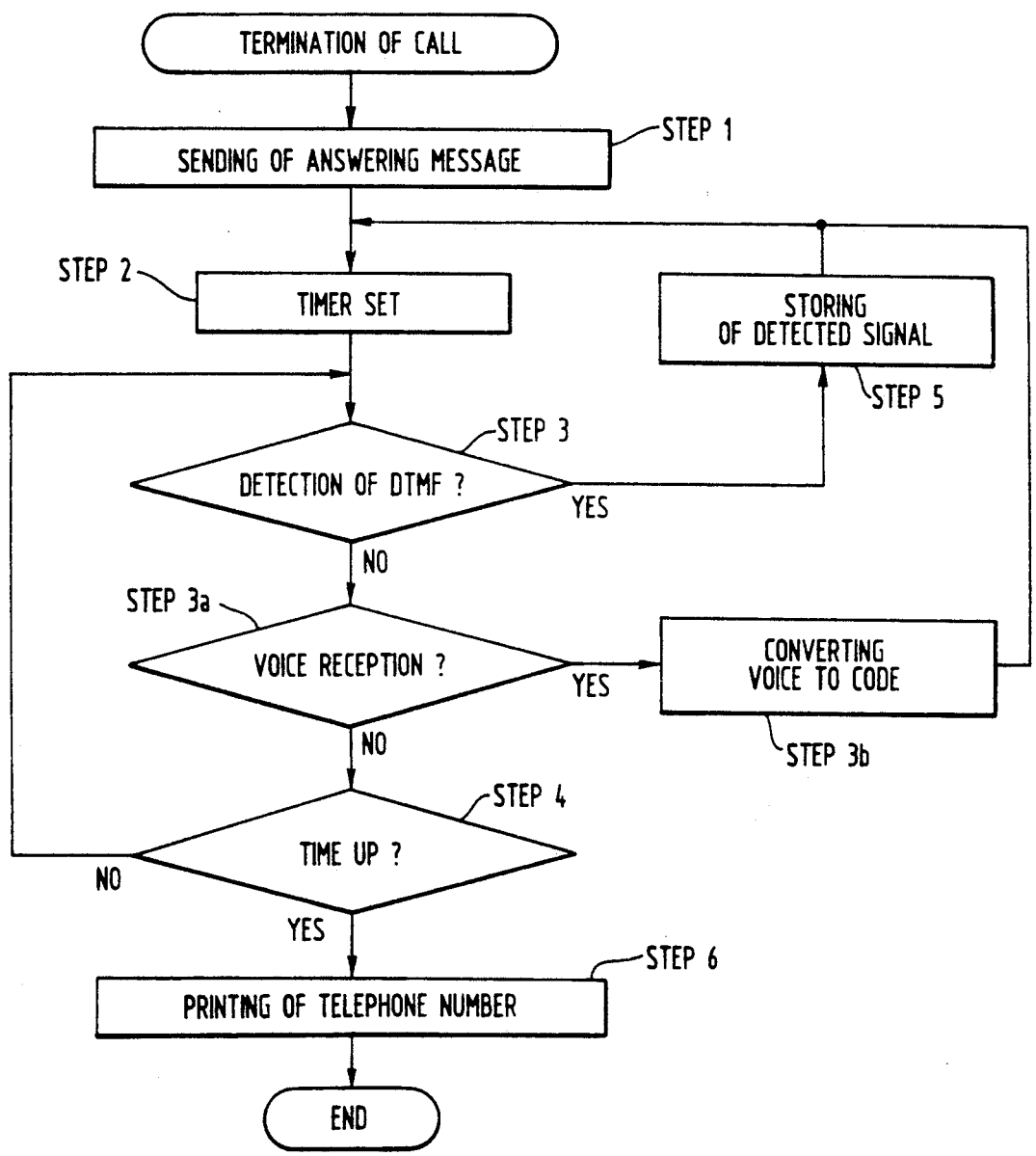
FIG. 1 is a flowchart illustrating one embodiment of the present invention.

An embodiment of the receiving method used when the automatic answering mode is set in the apparatus of FIG. 2 will be explained using the flowchart of FIG. 1.

The flowchart starts with termination of a call. In step 1, an answer message is transmitted. The answer message may require, in some cases, only a telephone number. For example, Hello. Mr. or Mrs. ooooo is speaking. But, I'm now absent. Please send me your telephone number using the push buttons. I'll make contact with you later." Thereafter, in step 2, a timer (not illustrated) is set to wait for reception of DTMF from the calling party, by looping step 3 and step 4. When DTMF corresponding to the dial number of one digit is received, step 3 skips to step 5 and the received number is stored in RAM 7. Thereafter, step 5 returns to step 2 and the timer is then set to receive the next digit. When the complete telephone number is input, the time up of timer is detected in step 4 and therefore step 4 skips to step 6. In step 6, the telephone number stored in RAM 7 is converted to the image data by the character generator as explained previously and is then output as the printed data by the printer 10. In this case, it is also possible to extract the time from 9 timer in the facsimile apparatus, to convert it to image data and print out time data with telephone number.

In steps 2 to 4, continuation of transmission is judged under the condition that the pushing interval of push buttons is set within the preset time of timer, namely about 2 seconds, but it is also possible to judge continuation of transmission under the condition that the total receiving time of telephone number is set within the predetermined period, for example, about 10 seconds.

Moreover, the telephone number may also be obtained, without the use of push buttons, through pattern recognition of the voice signal by requesting the voice input in the form of a message.

When telephone number is transmitted in any form, it may be recognized by 9 recognizing it whether it is DTMF or voice signal, after transmission of message.

In addition, it is also possible to record the conversation by sending a message urging the conversation after reception of the telephone number. Or, the conversation may also be recorded after input of the telephone number through the push buttons.

As will be apparent from the above explanation, according to the present invention, a call can be detected, even when a receiving party is absent, because the telephone number sent from a calling party is output as the printed output from the printing circuit of the facsimile apparatus by requesting at least the telephone number to the calling party in the automatic answering telephone system. Additionally, the calling party is capable of completing the communication with input of the telephone number through the use of push buttons without feeling any resistance to the automatic answering telephone system.

What is claimed is:

1. A method of receiving an incoming call from a calling party, comprising the steps of:
   sending a message to the calling party in response to a reception of the incoming call;
   receiving a voice signal generated by the calling party in response to the message; and
   generating image data corresponding to the received voice signal.

2. The method according to claim 1, wherein a plurality of voice signals are received and respective image data is generated corresponding to respective voice signals.

3. A facsimile device, comprising:
   modem means for receiving image data;
   character generator means for generating a character corresponding of the image data;
   message means for sending a message to a calling party in response to a reception of a call;
   voice receiving means for receiving a voice signal from the calling party; and
   conversion means converting the received voice signal into image data such that a charger corresponding to the received voice signal may be generated by the character generator means.

4. A facsimile device as claimed in claim 3, further comprising:
   recording means for recording a voice message form the calling party.

5. A facsimile device as claimed in claim 3, further comprising:
   dial tone receiving means for receiving a dial tone generated by a depression of a pushbutton by the calling party; and
   dial tone conversion means for converting the received dial tone into image data such that a character corresponding to the received dial tone may be generated by the character generator means.

* * * * *